(12) United States Patent
Marzano et al.

(10) Patent No.: US 8,711,547 B2
(45) Date of Patent: Apr. 29, 2014

(54) COMPACT BUS BAR ASSEMBLY, SWITCHING DEVICE AND POWER DISTRIBUTION SYSTEM

(75) Inventors: Thomas Strebel Marzano, Birmenstorf (CH); Willy Feller, Veyras (CH)

(73) Assignee: Rockwell Automation AG, Aarau (CH)

( * ) Notice: Subject to any disclaimer, the term of this patent is extended or adjusted under 35 U.S.C. 154(b) by 181 days.

(21) Appl. No.: 13/449,406

(22) Filed: Apr. 18, 2012

(65) Prior Publication Data

US 2012/0268865 A1    Oct. 25, 2012

(30) Foreign Application Priority Data

Apr. 20, 2011  (EP) .................................. 11163142

(51) Int. Cl.
*H02B 1/48*  (2006.01)
*H01H 9/02*  (2006.01)
*H02G 5/00*  (2006.01)

(52) U.S. Cl.
USPC ........... 361/624; 361/611; 361/612; 361/614; 361/648; 361/656; 174/68.2; 174/88 B; 174/99 B; 174/117 F; 174/133 B; 218/22; 218/34; 218/134; 218/149; 218/155

(58) Field of Classification Search
USPC ......... 361/601, 605, 608, 611, 612, 614, 620, 361/623, 624, 637–640, 648, 656, 658, 361/644; 174/68.2, 70 B, 71 B, 72 B, 88 B, 174/99 B, 117 F, 117 R, 149 R, 149 B, 137 R, 174/133 B; 439/212, 372, 527, 530; 200/48 R, 50 A, 48 V, 166 R; 218/22, 34, 218/118, 149, 155, 134, 143, 140, 2–14, 16, 218/43, 153, 154, 70, 74, 78, 84, 92, 119; 312/223.1

See application file for complete search history.

(56) References Cited

U.S. PATENT DOCUMENTS

| | | | | |
|---|---|---|---|---|
| 2,261,857 A * | 11/1941 | Novak et al. | ................. | 174/72 B |
| 2,376,307 A * | 5/1945 | Bosch | ..................... | 174/117 FF |
| 2,738,445 A * | 3/1956 | Hammerly et al. | ........... | 361/650 |
| 2,868,864 A * | 1/1959 | Page | ........................... | 174/99 B |
| 3,113,820 A * | 12/1963 | Norden | ......................... | 439/114 |
| 3,307,004 A * | 2/1967 | Bottonari | ........................ | 218/22 |
| 3,345,455 A * | 10/1967 | Goody | ........................ | 174/112 |
| 3,469,149 A * | 9/1969 | Paape | ............................ | 361/624 |
| 3,600,802 A * | 8/1971 | Jorgensen et al. | ............. | 29/885 |
| 3,816,171 A * | 6/1974 | Toth et al. | ..................... | 427/125 |
| 3,855,504 A * | 12/1974 | Olashaw | ...................... | 361/614 |
| 4,024,441 A * | 5/1977 | Coyle et al. | ................... | 361/624 |

(Continued)

FOREIGN PATENT DOCUMENTS

| | | | | |
|---|---|---|---|---|
| EP | 1331711 A2 * | 6/2008 | ............. | H02B 1/052 |
| EP | 2107659 A1 * | 10/2009 | ............... | H02G 5/00 |

*Primary Examiner* — Michail V Datskovskiy
(74) *Attorney, Agent, or Firm* — Boyle Fredrickson, S.C.

(57) ABSTRACT

A contact bus bar assembly for supplying power to a load, and further pertains to a switching device which can be connected to such a compact bus bar assembly, and to a power distribution system. The bus bar assembly includes at least two electrically conductive tracks which are at least partly covered by an electrically insulating cover. An outer surface of said insulating cover is provided with a plurality of ribs arranged in a region connecting pin terminals. The switching device may additionally comprise a separating element provided with a plurality of second ribs.

12 Claims, 3 Drawing Sheets

(56) References Cited

U.S. PATENT DOCUMENTS

| | | | |
|---|---|---|---|
| 4,025,826 A * | 5/1977 | Wilson et al. | 361/624 |
| 4,038,585 A * | 7/1977 | Wolski et al. | 361/624 |
| 4,180,845 A * | 12/1979 | Shariff et al. | 361/624 |
| 4,199,655 A * | 4/1980 | Shariff et al. | 174/72 B |
| 4,205,198 A * | 5/1980 | Boyle et al. | 174/171 |
| 4,208,543 A * | 6/1980 | Boyle et al. | 174/152 R |
| 4,360,857 A * | 11/1982 | Olashaw | 361/648 |
| 4,602,313 A * | 7/1986 | Takahashi | 361/614 |
| 4,744,003 A * | 5/1988 | Koslosky et al. | 361/656 |
| 4,822,951 A * | 4/1989 | Wilson et al. | 174/68.2 |
| 5,705,773 A * | 1/1998 | Smith | 174/75 B |
| 5,915,998 A * | 6/1999 | Stidham et al. | 439/723 |
| 6,040,976 A * | 3/2000 | Bruner et al. | 361/611 |
| 6,142,807 A * | 11/2000 | Faulkner | 439/212 |
| 6,288,338 B1 * | 9/2001 | Kauffman et al. | 174/99 B |
| 7,053,302 B2 * | 5/2006 | Bjorklund et al. | 174/68.2 |
| 7,084,727 B2 | 8/2006 | Bauer et al. | |
| 7,182,631 B2 * | 2/2007 | Kollmann | 439/511 |
| 7,239,813 B2 * | 7/2007 | Yajima et al. | 398/154 |
| 7,719,823 B2 * | 5/2010 | Josten et al. | 361/611 |
| 8,258,404 B2 * | 9/2012 | Latimer | 174/149 B |
| 2007/0042625 A1 * | 2/2007 | Otto et al. | 439/212 |

* cited by examiner

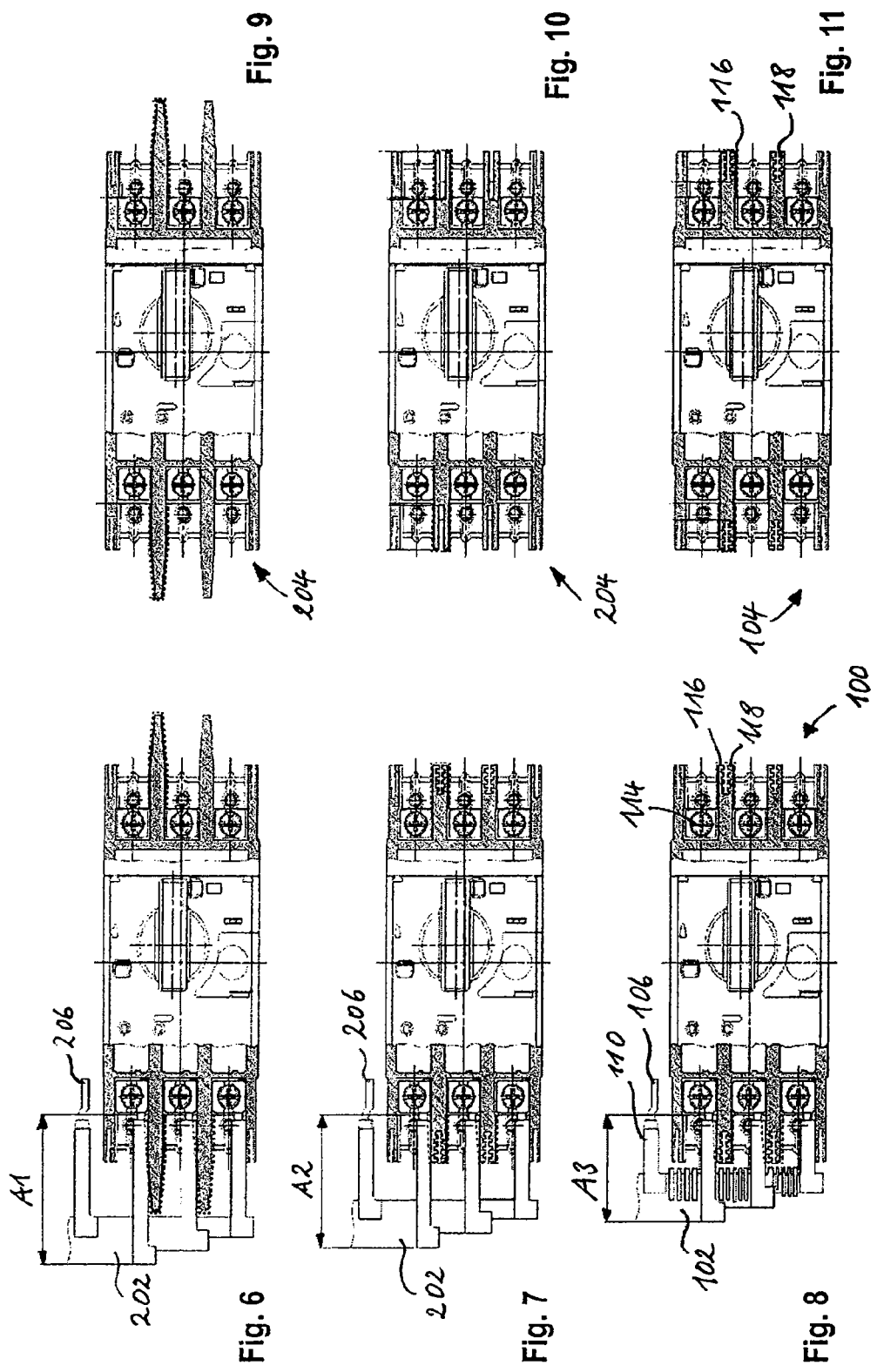

COMPACT BUS BAR ASSEMBLY, SWITCHING DEVICE AND POWER DISTRIBUTION SYSTEM

CROSS-REFERENCE TO RELATED APPLICATIONS

This application claims priority to European Patent Application No. EP 11163142 filed on Apr. 20, 2011 titled "Compact Bus Bar Assembly, Switching Device and Power Distribution System", the disclosure of which is expressly incorporated herein.

BACKGROUND

The present invention relates to a contact bus bar assembly for supplying power to a load, and further pertains to a switching device which can be connected to such a compact bus bar assembly. In particular, the present invention relates to a power distribution system using bus bars for conducting higher currents, e. g. when supplying power to a motor and wherein switching devices are used, for instance, for opening and closing the connection to the power supply.

For instance, from U.S. Pat. No. 7,084,727 B2, such switching devices are known which have separating elements between terminals of different polarity that are provided on an adapter element. The disadvantage of this arrangement can be seen firstly in the fact that the footprint is much larger than the size of the switching device according to the present invention. Secondly, the electrically insulating elements are only provided on adapter units which are independent of the standard switch unit. Thus, the dimension in a direction across the bus bar assembly is rather large, which for instance in connection with switching cabinets is disadvantageous.

In particular, in the field of circuit breakers for switching off loads, often high currents occur and particular requirements regarding creepage distances and air gaps have to be fulfilled regarding connecting terminals of different polarity.

In particular, electromechanical circuit breakers according to UL 489 (Underwriters Laboratories Inc., UL 489, 11$^{th}$ edition, "Molded Case Circuit Breakers, Molded Case Switches, and Circuit-Breaker Enclosures", Sep. 1, 2009) require a two inches creepage distance and a one inch clearance distance, which is up to four times larger compared to UL 508 "Manual Motor Controllers" of basically the same design.

In particular, Table 6.1.6.1.1 "Minimum spacings in millimeters" of UL 489 require for voltages of 301 V to 600 V between parts a spacing between terminals of opposite polarity on 25.4 mm through air and 50.8 over surface, respectively.

Furthermore, the corresponding IEC standards do not differentiate these breaker categories and allow dimensions similar to the requirements of UL 508. Consequently, the UL 489 requirements are the most stringent ones and lead normally to considerably larger dimensions and larger footprints (about 30% larger than for UL 508).

One aspect underlying the present invention is therefore to provide a compact bus bar assembly, a switching device and a power distribution system which fulfils the strict requirements according to US 489 and on the other hand is small enough to stay within the footprint of the requirements according to UL 489.

SUMMARY OF THE INVENTION

The present invention resolves one or more of the aforementioned drawbacks.

One aspect of the invention discloses that by geometrically modifying the bus bar assembly and/or the switching device, much smaller overall dimensions can be achieved while still fulfilling the requirements according to UL 489 regarding clearance distance and air gap.

A compact bus bar assembly for supplying power to a load according to one aspect of the present invention includes at least two electrically conductive tracks, which are at least partly covered by an electrically insulating cover. These electrically conductive tracks each comprise at least one output terminal to be connected to the load, and each output terminal is formed as a pin terminal having an electrically insulating sleeve formed from the electrically insulating cover and partly covering the terminals.

It is further disclosed that the outer surface of the insulating cover be provided with a plurality of ribs arranged in a region connecting said pin terminals. By this modification, the creepage distance can be extended without having to enlarge the length of the pin terminals and therefore without having to provide more space for the pin terminals at the corresponding receptacles of, for instance, a switching device.

These ribs can advantageously be integrated into a mold forming the electrically insulating overmold of the compact bus bar assembly. Thus, in a particularly simple and economic way, a compact bus bar assembly with minimized geometric dimensions can be provided that still fulfills the strict requirements of UL 489.

In order to provide a particularly space saving compact bus bar assembly, for instance, for assembly in an electric control cabinet, the electrically conductive tracks are preferably arranged in one plane and the pin terminals are extending in a direction across to a longitudinal axis defined by the conductive tracks. Thus, a particularly flat and space saving arrangement can be achieved.

In order to lengthen the potential creepage current path, the electrically insulating ribs are preferably U-shaped, encompassing the part of the electrically conductive tracks between the pins with different polarity.

Forming the insulating sleeve of the pins, the plurality of ribs and the complete insulating cover as one single-piece overmold allows not only for a particularly simple and cost-effective fabrication, but also provides protection against humidity, corrosion, as well as unintended or undesired contact, and optimal electric insulation.

Of course, any number of pin terminals and electrically conductive tracks can be envisaged depending on the amount of poles and conductive lines, which have to be interconnected. Usually, this will be two poles or three for motor applications, but of course also four, five, six or more poles can be interconnected by means of the compact bus bar assembly.

A switching device according to the present invention comprises at least one contact device for opening and closing an electrical connection between an input line and an output line. An electrically insulating housing is provided and at least two input connectors are arranged recessed within the housing for connecting the input line to an external terminal. The housing of the switching device according to the present invention comprises at least one separating element for electrically separating the input connector from another connector. Each separating element is provided with a plurality of ribs extending across a creepage current path between the input connectors.

Thus, the overall dimensions of the switching device can be reduced significantly and the switching device still fulfills the requirements according to UL 489, as explained above.

A particularly secure way of electrically insulating two input terminals with different polarity from each other is to provide around each of the input connector an at least partly closed collar and to arrange the plurality of ribs on at least one outer sidewall of the collar, in particular on that side which is adjacent to the terminal with the other polarity.

By appropriately choosing the dimensions of the ribs and the depths of the separating element, in particular, the collar, a creepage distance of more than or equal to two inches (50.8 mm) can be defined. Furthermore, the requirement of an air gap of more than or equal to one inch (25.4 mm) can be complied with.

Several of the advantages of the present invention can be beneficially exploited when combining a compact bus bar assembly having a plurality of ribs in a region connecting the pin terminals with a switching device where the housing comprises at least one separating element for electrically separating the input connectors from each other, which is provided with a plurality of ribs extending across a creepage current path between the input connectors.

This combination of a switching device, such as a circuit breaker, with a compact bus bar assembly according to one aspect of the present invention allows for a universal, space saving and secure power distribution system. The complete assembly has outer dimensions which are compatible with Underwriter laboratories standard UL 508, but comply with the stricter requirements regarding creepage distance and air gap of the standard UL 489.

The bus bar assembly can be used with both categories of breakers instead of having two different sets. This facilitates fabrication and assembly and therefore further reduces costs.

According to one aspect of the invention, the bus bar assembly includes three electrically conductive tracks for being connected to a three-phase power supply and a switching device that comprises three input connectors which are connected to the output terminals of the bus bar assembly. However, it is appreciated that any number of poles can be advantageously handled by a system according to the present invention.

According to another aspect of the invention, the output terminals are preferably fixed at the input connectors by means of a screw fitting. However, it is also appreciated that other electric connecting techniques, such as clamps without screws, plug connections, press-fit pins, solder connections etc. may be used for the power distribution system according to the present invention. The choice of the most suitable connecting scheme will depend on the particular application environment. For example, it is appreciated that a motor vehicle switch will preferably be connected by a much more vibration protected electrical connection technique, whereas, in a switching cabinet, the maintenance and replaceability a switching device may be of more importance.

The power distribution system according to the present invention may most advantageously be applied for a system, where the switching devices formed by a molded case circuit breaker, also called MCCB.

BRIEF DESCRIPTION OF THE DRAWINGS

The accompanying drawings are incorporated into and form a part of the specification and illustrate several embodiments of the present invention. These drawings together with the description serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will become apparent from the following more particular description of the various embodiments of the invention, as illustrated in the accompanying drawings, in which like references refer to like elements, and wherein:

FIG. 6 shows a partly cut view of a conventional power distribution system;

FIG. 7 shows a partly cut view of a power distribution system having a switching device according to the present invention;

FIG. 8 shows a partly cut view of a power distribution system according to an advantageous embodiment;

FIG. 9 shows a partly cut view of a conventional stand-alone switching device;

FIG. 10 shows another conventional stand-alone switching device; and

FIG. 11 shows a partly cut view of a stand-alone switching device according to the present invention.

DETAILED DESCRIPTION

Figure 2:
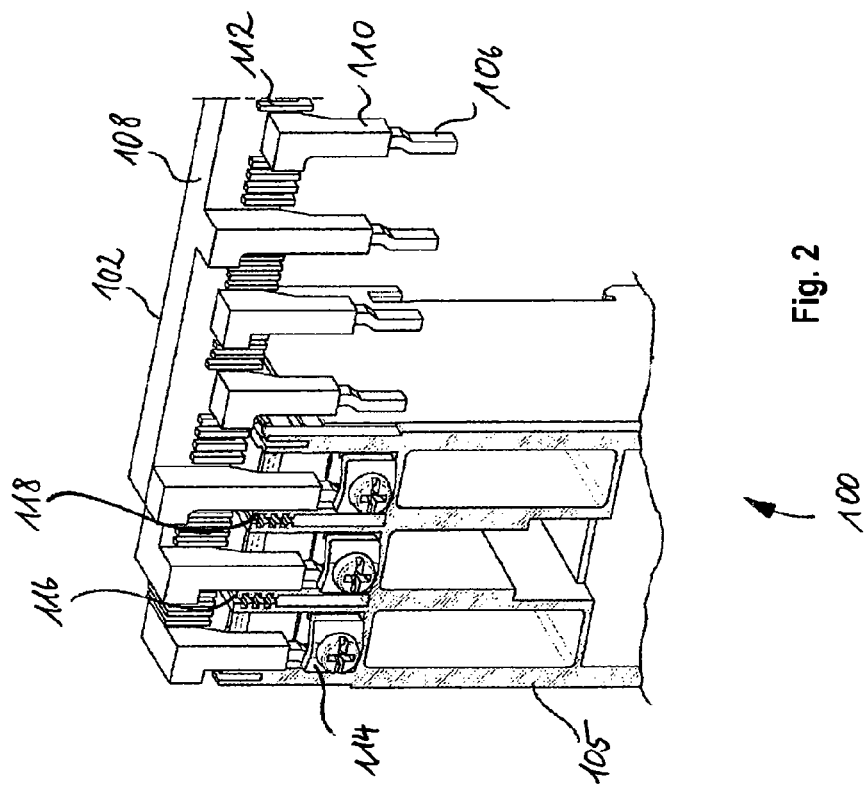
FIG. 2 shows a partly cut view of the arrangement of FIG. 1.
Figure 1:
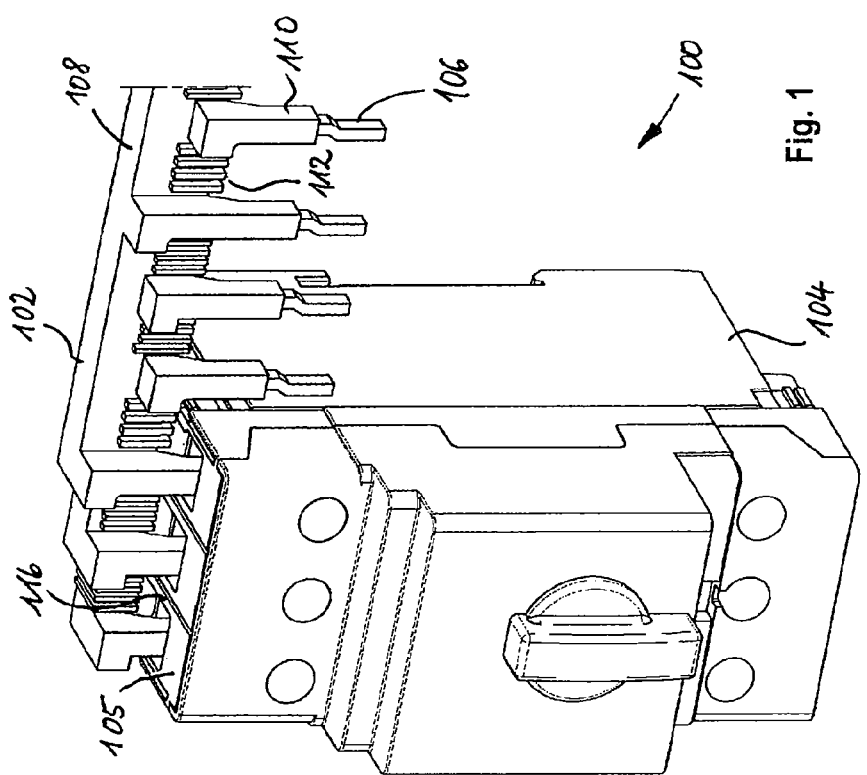
FIG. 1 shows a perspective view of a power distribution system according to the present invention.

Referring now to FIGS. 1 and 2, a power distribution system 100 according to the present invention comprises a bus bar assembly 102 with three parallel electrically conductive tracks from which several terminals 106 are branched off.

In the shown embodiment, a switching device 104 is a motor protection circuit breaker with a housing 105, which provides motor protection in case of motor overload, short circuit and phase failure. Such circuit breakers are designed for industrial use applications in control cabinets or on machine panels for any motor starter with basic protection requirements. Application fields are, for instance, industries such as automotive, food and beverage, life science, packaging, water/waste water or material handling. It should be understood that these are merely exemplary application fields and those skilled in the art will readily appreciate that the disclosure of the present application is applicable to any number of fields.

That is, it is appreciated that the principles of the present invention may be applied to any sort of connected device which has at least one input connector for being connected to one of the neighboring terminals of different polarity.

In the embodiment shown in FIGS. 1 and 2, the bus bar assembly 102 comprises three electrically conductive tracks (not visible in the figure) which are connectable to outside devices via pin terminals 106, in order to provide a compact and securely electrically insulated bus bar assembly, the electrically conductive tracks are embedded into a plastic overmold 108. This construction limits exposure of the electrically conductive tracks. Each terminal is partly covered by an electrically insulating sleeve 110, which only leaves the contact region of the pin terminals 106 open for a connection to, for instance, the switching device 104.

According to one aspect of the present invention, the bus bar assembly 102 has a plurality of first ribs 112, which are arranged on the overmold 108 between the individual pin terminals 106. Thus, a creepage current path between two pin terminals is significantly enlarged, thereby allowing the sleeve 110 and correspondingly also the whole pin 106 to be designed shorter than with known designs.

Moreover, according to another aspect of the present invention, the switching device has input connectors 114, which are surrounded by collars 116 forming an electrically separating element (see FIG. 2). In the shown embodiment, the input connectors 114 are formed by screwed connectors. However, the principles according to the present invention may be employed for all sorts of electrical connections between a bus bar assembly and a switching device, such as clamping, plug connections, soldered connections, or press-fit pin connections as only a limited number of applicable examples.

According to another aspect of the present invention, each collar 116 has a plurality of ribs 118, which extend the creepage distance between two adjacent input connectors 114.

Figures 3, 4, 5:
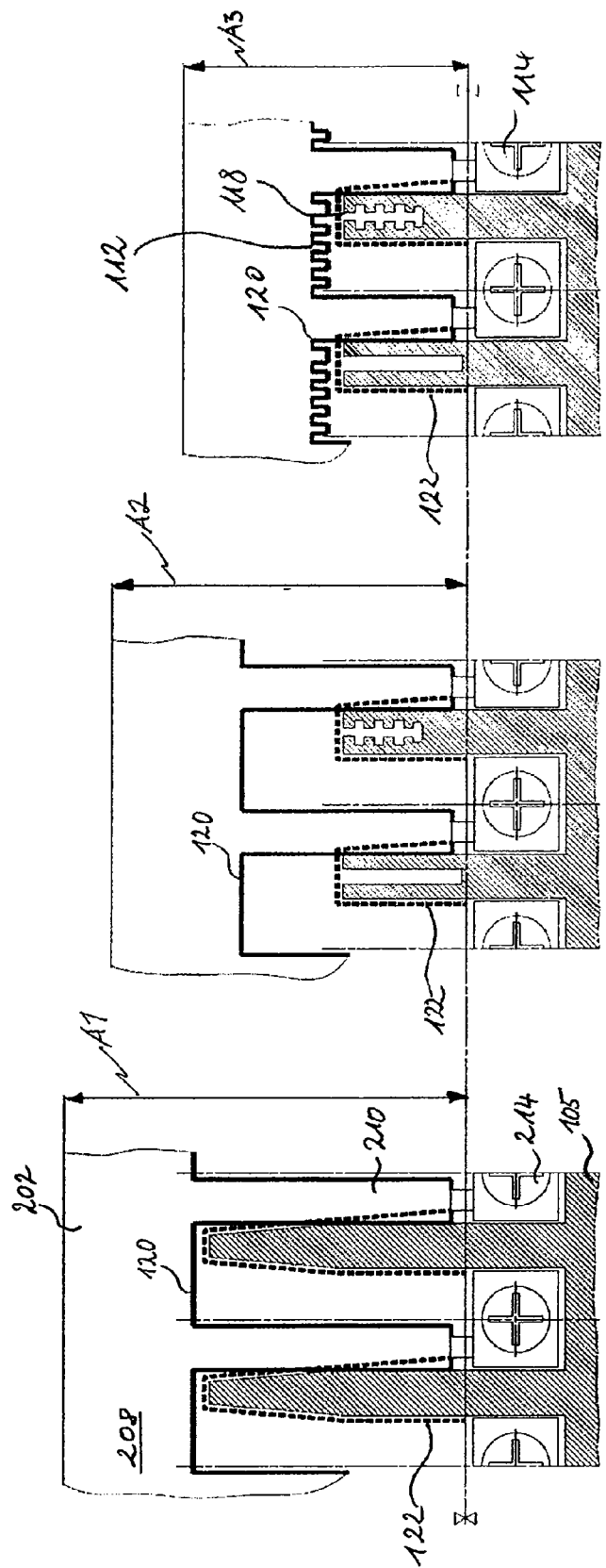
FIG. 3 shows a detail of a conventional switching device with a connected bus bar assembly.
FIG. 4 shows the switching device according to the present invention combined with a conventional bus bar assembly.
FIG. 5 shows a switching device and a bus bar assembly according to an advantageous embodiment.

FIGS. 3 to 5 explain the impact on the necessary dimensions in detail. FIG. 3 shows the necessary dimensions for a know bus bar/switching device assembly. The known bus bar 202 has an overmold 208 and pin terminals 206 with electrically insulating sleeves 110. No ribs are provided between the pin terminals and thus the length of the electrically insulating sleeve 210 has to provide the necessary creepage distance. Consequently, the distance between an outer boundary of the bus bar assembly 202 and the input connectors 214 has a comparatively large dimension A1. In all the figures, the creepage distance/path is shown as line 120, whereas the spatial clearance is shown as broken line 122. An improvement of the geometric dimensions can be reached by providing a separating element in the form of a collar around each input connector 114. Thus, the electrically insulating sleeves 210 of the bus bar assembly 202 according the present invention may be shorter than in the case of FIG. 3.

FIG. 5 shows a combination of a bus bar assembly 102 with first ribs 112 between the pin terminals 106 and a switching device 104 having second ribs 118 provided at collars 116 arranged around the input connectors 114. By providing ribs 112 and ribs 118 on both components, the bus bar assembly 102 and the switching device 104, the dimension between the input connectors 114 and the outer boundary of the bus bar assembly 102 can be made significantly shorter than in the cases of FIGS. 3 and 4, as indicated by distance A3.

Another comparison of footprint and distances is given in FIGS. 6 to 11. FIGS. 6 and 9 show the dimensions of a conventional circuit breaker, in FIG. 6 in combination with a conventional bus bar assembly and in FIG. 9 as a stand-alone molded case circuit breaker (MCCB).

As can be seen from a comparison of FIGS. 6 and 7, by introducing the second ribs 118 at the collars 116, the bus bar assembly may be further reduced in length, in particular of the sleeves 210. FIG. 8 shows the case where additionally to the collars 116 with the second ribs 118, first ribs 112 are provided between the pin terminals 106. Corresponding to FIGS. 3 to 5, dimensions A1, A2 and A3 illustrate the advantageous reduction of size that can be achieved with the various aspects of the present invention. In particular, dimension A3 of FIG. 8 may be as small as 1.06535 inches or 27.06 mm.

FIG. 9 shows the conventional circuit breaker 204 of FIG. 6 in the configuration as a stand-alone MCCB. FIG. 10 shows another conventional switching device 204, which has collars without ribs around the input connectors 214. This solution allows reduction of the overall dimensions of the stand-alone circuit breaker significantly, but does not fulfill the requirements of UL 489. By introducing the ribs 118, as shown in FIG. 11, the creepage distance 120 can be made large enough to fulfill even the stricter requirements of UL 489.

Although the switching devices according to the present invention are shown as having three poles per device, even single pole devices can be constructed according to the present invention, in order to allow a side-by-side assembly of a plurality of single-pole switching devices at a common bus bar assembly. In such a configuration, the input connectors of each individual single-pole switch are preferably provided with a collar according to the present invention.

In summary, a linear application of the design rules necessary for meeting the requirements of UL 489 leads to unacceptably large spatial dimensions (see FIG. 6). By inserting gaps and preferable straight gaps and additional ribs into the circuit breaker only, the dimensions can be reduced significantly. In combination with a bus bar assembly having ribs molded thereon between the pin terminals, the complete system has minimum overall dimensions and still meets the requirements of the standard UL 489 for voltages over 300 V.

What is claimed is:

1. Compact bus bar assembly for supplying power to a load, said bus bar assembly comprising:
   at least two electrically conductive tracks which are at least partly covered by an electrically insulating cover;
   said electrically conductive tracks each comprising at least one output terminal to be connected to said load, wherein said output terminals are formed as pin terminals having an electrically insulating sleeve formed from the electrically insulating cover and partly covering said terminals; and
   wherein an outer surface of said insulating cover is provided with a plurality of ribs arranged in a region connecting said pin terminals.

2. Compact bus bar assembly according to claim 1, wherein said electrically conductive tracks are arranged in one plane, said pin terminals extending in a direction across to a longitudinal axis defined by said conductive tracks.

3. Compact bus bar assembly according to claim 1, wherein said electrically insulating cover, said insulating sleeve and said plurality of ribs are formed as a single-piece overmold.

4. Compact bus bar assembly according to claim 1, wherein said electrically insulating ribs are each U-shaped.

5. Power distribution system comprising:
   at least one compact bus bar assembly for supplying power to a load, said bus bar assembly comprising at least two electrically conductive tracks which are at least partly covered by an electrically insulating cover;
   said electrically conductive tracks each comprising at least one output terminal to be connected to said load, wherein said output terminals are formed as pin terminals having an electrically insulating sleeve formed at the electrically insulating cover and partly covering said pin terminals;
   at least one switching device comprising at least at least one contact device for opening and closing an electrical connection between an input line and an output line, an electrically insulating housing, and at least one input connector for connecting said input line to said pin terminal;
   wherein an outer surface of said insulating cover is provided with a plurality of first ribs arranged in a region connecting said pin terminals; and
   wherein said housing comprises at least one separating element for electrically separating said input connector from another connector, and wherein said separating element is provided with a plurality of second ribs extending across a creepage current path between said input connector and the other connector.

6. Power distribution system according to claim 5, wherein said bus bar assembly comprises three electrically conductive tracks for being connected to a three phase power supply, and wherein said switching device comprises three input connectors which are connected to said output terminals of the bus bar assembly.

7. Power distribution system according to claim 5, wherein said output terminals are fixed at the respective input connector by means of a screw fitting.

8. Power distribution system according to claim 5, wherein the switching device is formed by a molded case circuit breaker (MCCB).

9. Power distribution system according to claim 5, wherein said insulating sleeve and said plurality of first ribs are dimensioned to define a creepage distance of more than or equal to 2.0 inches (50.8 mm).

10. Power distribution system according to claim 5, wherein said insulating sleeve and said plurality of first ribs are dimensioned to define an air gap of more than or equal to 1.0 inch (25.4 mm).

11. Power distribution system according to claim 5, wherein said separating element and said plurality of second ribs are dimensioned to define a creepage distance of more than or equal to 2.0 inches (50.8 mm).

12. Power distribution system according to claim 5, wherein said separating element and said plurality of second ribs are dimensioned to define an air gap of more than or equal to 1.0 inch (25.4 mm).

* * * * *